Jan. 1, 1935. J. E. ALLAN 1,986,094

BEAD FORMING APPARATUS

Filed Aug. 11, 1932 5 Sheets-Sheet 1

INVENTOR.
JAMES E. ALLAN
BY
ATTORNEYS.

Jan. 1, 1935. J. E. ALLAN 1,986,094
BEAD FORMING APPARATUS
Filed Aug. 11, 1932 5 Sheets-Sheet 2

INVENTOR.
JAMES E. ALLAN
BY
ATTORNEYS.

Jan. 1, 1935.  J. E. ALLAN  1,986,094
BEAD FORMING APPARATUS
Filed Aug. 11, 1932  5 Sheets-Sheet 3
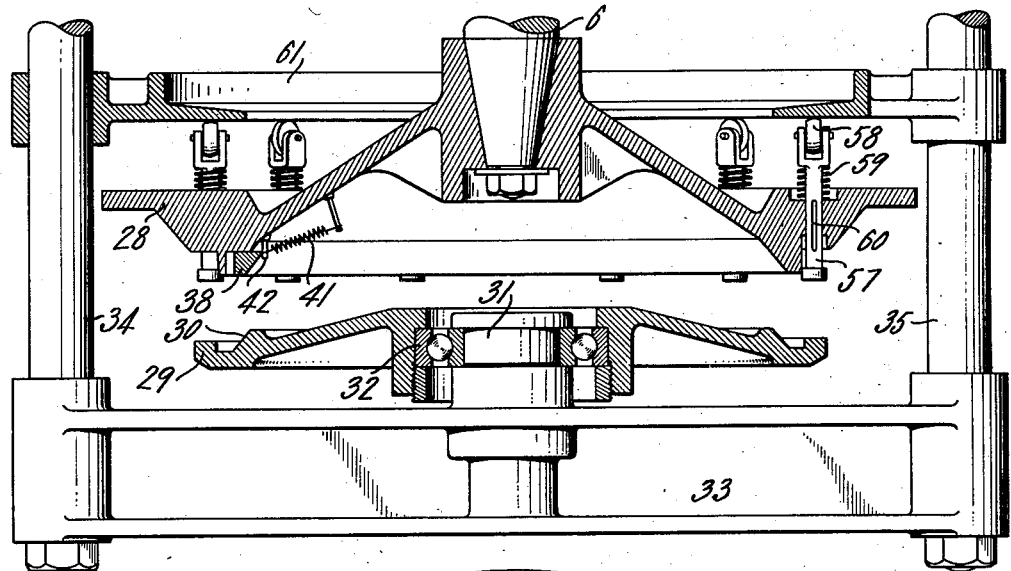
Fig. 4.
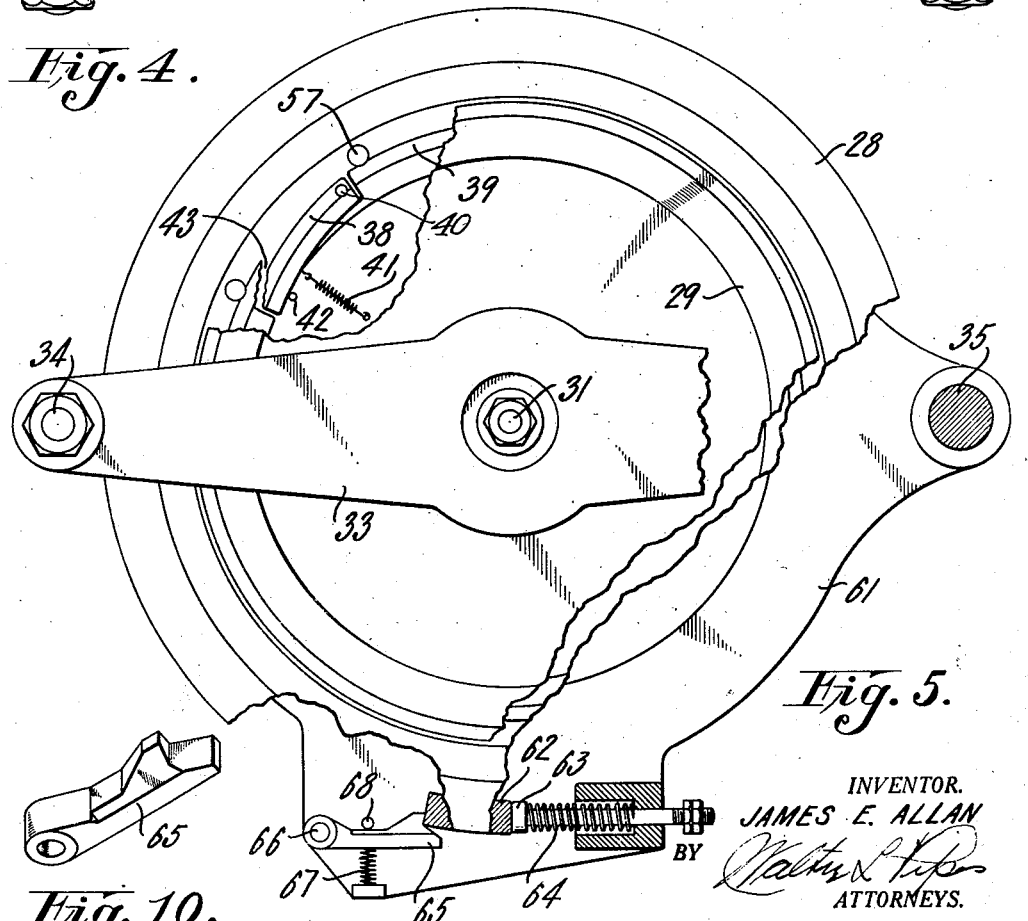
Fig. 5.
Fig. 10.
INVENTOR.
JAMES E. ALLAN
BY
ATTORNEYS.

Jan. 1, 1935. J. E. ALLAN 1,986,094
BEAD FORMING APPARATUS
Filed Aug. 11, 1932 5 Sheets-Sheet 4
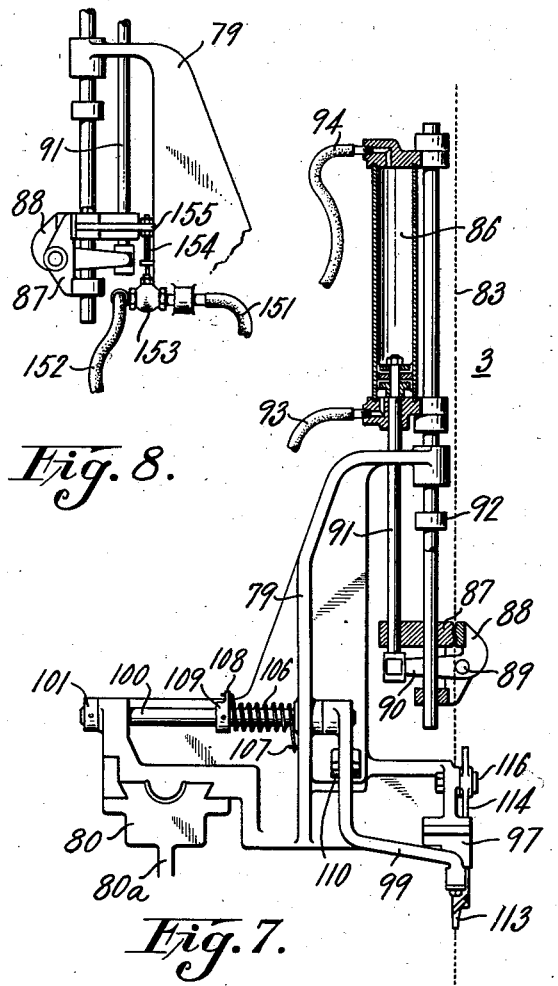
Fig. 8.
Fig. 7.
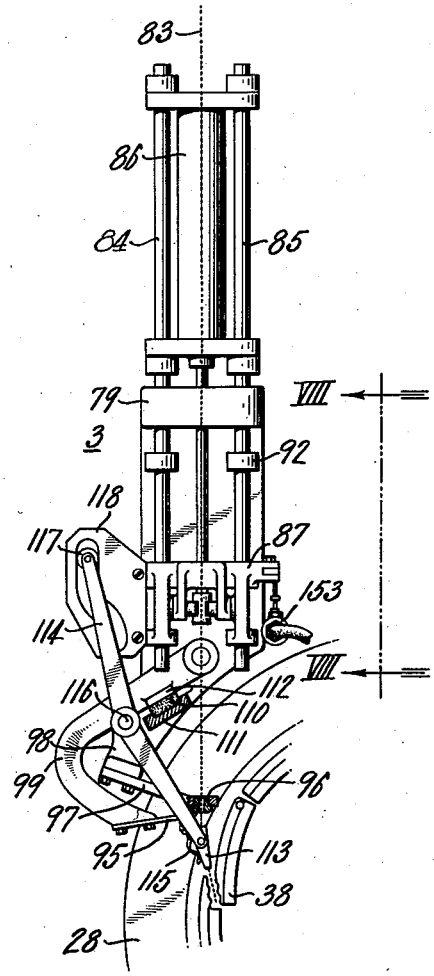
Fig. 6.
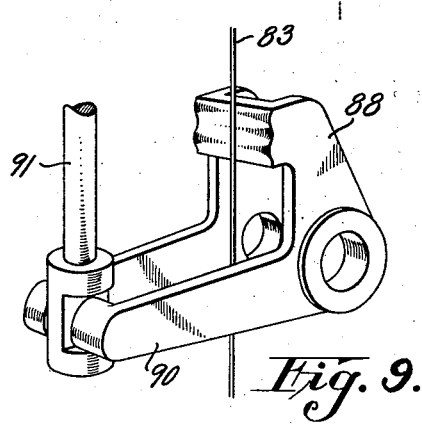
Fig. 9.
INVENTOR.
JAMES E. ALLAN
BY
ATTORNEYS.

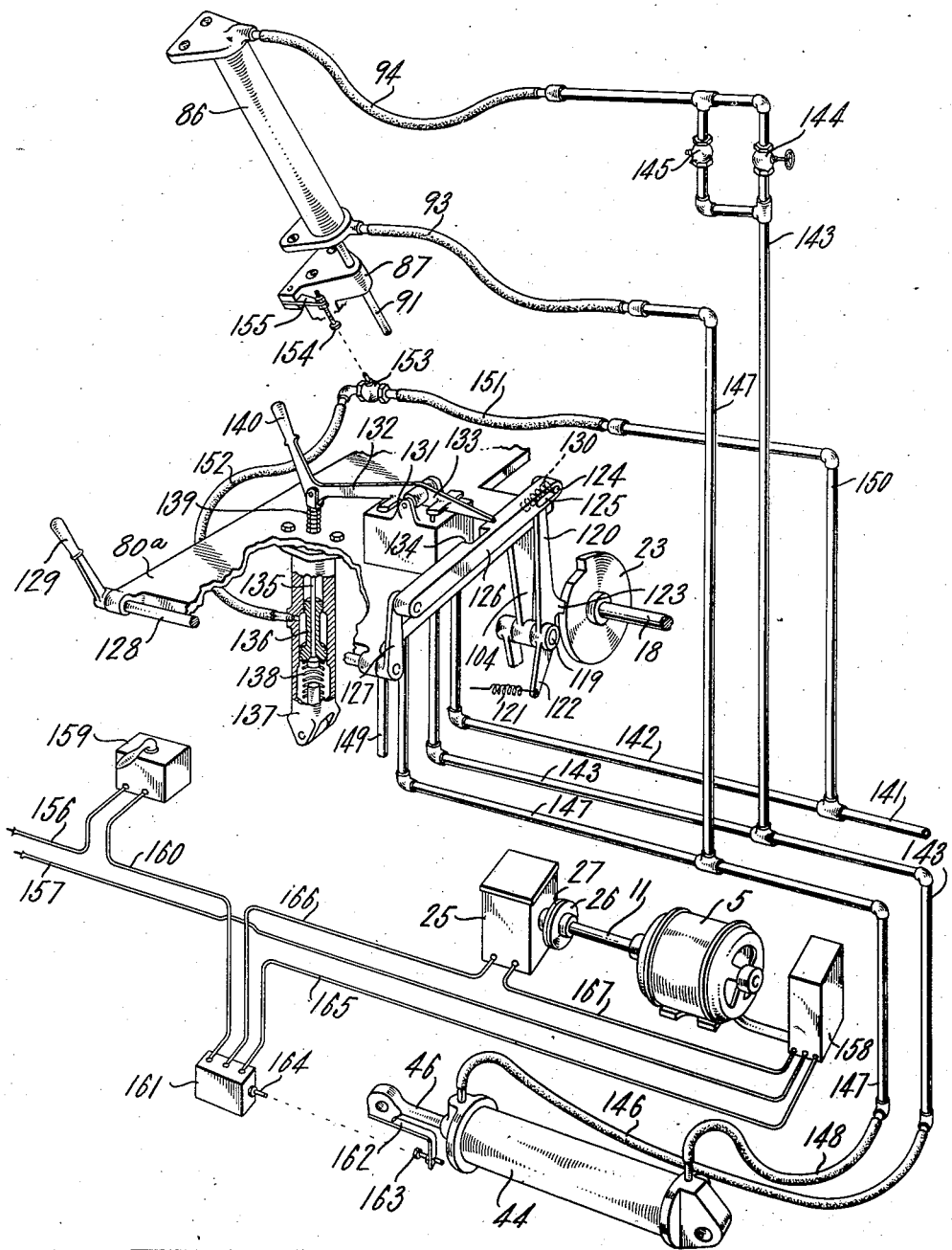

Patented Jan. 1, 1935

1,986,094

UNITED STATES PATENT OFFICE 1,986,094

BEAD FORMING APPARATUS

James E. Allan, Fife Lake, Mich., assignor to Morgan & Wright, Detroit, Mich., a corporation of Michigan Application August 11, 1932, Serial No. 628,357

16 Claims. (Cl. 140—92.2)

My invention relates to winding mechanisms, and in particular to apparatus for forming bead rings for pneumatic tires.

Generally, the apparatus consists of means for feeding a rubber insulated strand of wire on to a reel, clamping the end thereof, winding same in a plurality of convolutions, cutting the opposite end, and ejecting the completed annulus from the apparatus.

Among the objects and advantages of my invention are speed in production, economy in operation, and uniformity of finished product.

I am aware that, prior to my invention, other bead forming machines have been made, but such machines were not adapted to the present method of bead construction and were not completely automatic. The present apparatus is one which, when once set in operation, requires no further manual operation to maintain its production. In other words, the machine is completely automatic, winding and ejecting each annulus and starting each successive annulus in one continuous operation.

The machine herein described is particularly applicable to single strand wires as disclosed in a previous patent application to Abbott, Serial No. 543,612, filed June 11, 1931, and reference to which may be made for a more complete description of the bead ring as described herein.

The invention is illustrated in the accompanying drawings, in which:

Fig. 4 is a plan view, partly in section, of the winding head;

Fig. 5 illustrates a front elevation thereof;

Fig. 6 is a front elevational view of the cutting and feeding mechanism;

Fig. 7 is a side view thereof, partly in section;

Fig. 8 is a detailed view as seen from the directional lines VIII—VIII on Fig. 6;

Fig. 9 illustrates a perspective view of the wire clamping jaw;

Fig. 10 is a perspective view of the winding reel latch lock;

Fig. 15 is a diagrammatic view of the piping and electrical connections, together with the actuating elements for controlling the automatic operation of the apparatus.

Figure 1:
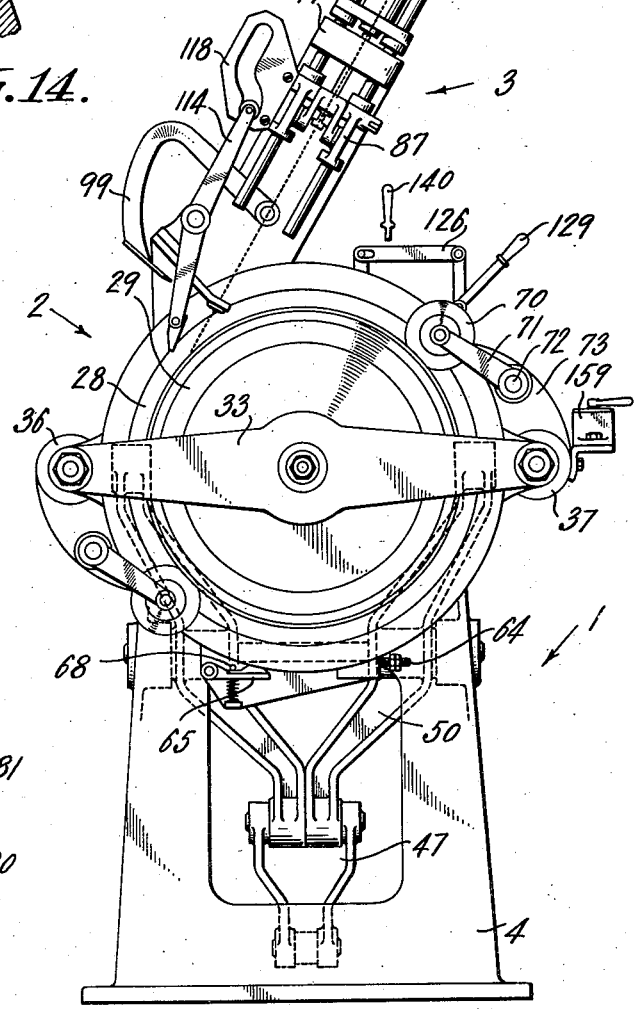
Figure 1 is a front elevational view of the complete apparatus.

Referring now to Fig. 1, numeral 1 represents the base portion of the apparatus which includes the driving mechanism and mechanism for causing the axial movement of the winding flange; numeral 2 represents the winding head on which the annular bead rings are wound, and 3 the feeding and cutting mechanism cooperating with the winding head. The entire mechanism is supported by a framework or base 4 which retains the component elements in convenient relation for the operator.

Driving mechanism

Figures 2, 3:
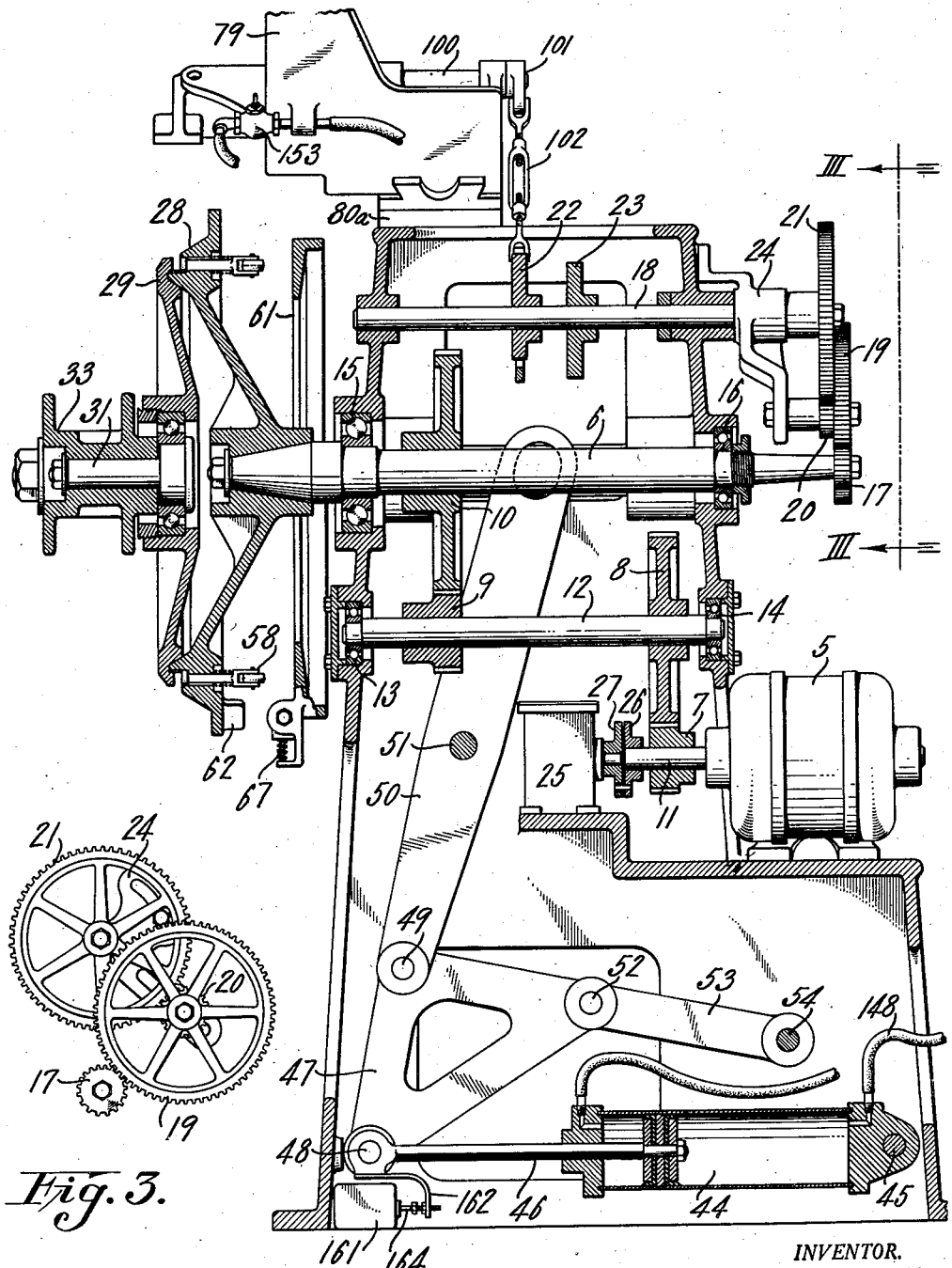
Fig. 2 is a sectional side elevational view thereof.
Fig. 3 illustrates in detail the cam shaft timing gears, looking in the direction of lines III—III of Fig. 2.

The driving mechanism is particularly illustrated in Fig. 2. It comprises a motor 5 connected to a horizontally disposed main shaft 6 by a train of gears 7, 8, 9 and 10. The gear 7 is mounted on the motor shaft 11, and the gears 8 and 9 are keyed to a countershaft 12 mounted in bearings 13 and 14 retained in a housing of the main frame 4.

The main shaft 6, on which gear 10 is keyed, is supported from the frame by roller bearings 15 and 16. A gear 17, also keyed to shaft 6 drives the cam shaft 18 through the gears 19, 20 and 21, shown in detail in Fig. 3. The cam shaft carries a knife operating cam 22 and a cylinder operating cam 23. A bracket 24 supports gears 19 and 20 in such manner that different sized gears may be employed to effect different speeds for different sizes of bead wires.

Motor shaft 11 couples with an inertia relay 25 by means of flanges 26 and 27. The purpose of this relay will be hereinafter described.

Winding head

Figs. 2, 4, 5 and 14 illustrate in particular the winding head and operating mechanism for coiling the wire into an annulus. It is divided principally into disc flanges 28 and 29 which, when brought together, form a groove into which the wire is wound.

Figure 14:
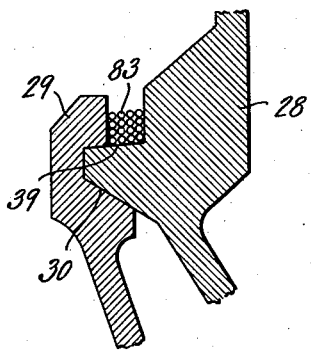
Fig. 14 shows an enlarged cross sectional view of the groove formed by the winding flanges.

The flange 28 is keyed to shaft 6 and forms one side and the bottom of the groove. Flange 29 forms the other side of the groove when the two flanges are in engagement. When so engaged, flange 29 is driven by flange 28 as a unitary grooved flange. A beveled edge 30 on flange 29 contacts with a complementary beveled edge on flange 28, as shown in Fig. 14, and provides means for frictionally driving flange 29.

Flange 29 is freely rotatable on a spindle 31 by means of roller bearing 32. Spindle 31 is in axial alignment with shaft 6 and is supported by frame 33 which, in turn, is supported by rods 34 and 35 slidably mounted in bearings 36 and 37 respectively on frame 4.

When a single strand of wire is in receptive position for the winding mechanism, the two flanges are axially separated. A segment 38, forming a part of the bottom of a winding groove 39 swings on its pivot 40 through the action of the spring 41 until the segment rests against the stop 42. This provision supplies a gap 43 at the bottom of the groove. The gap is formed in part by the end of the segment 38 and the end of the beveled extension of the flange 28 which forms the bottom of the groove 39, each end having a corrugated face in order to grip the wire when clamped therein. The gap is so positioned that it extends substantially in the direction of the wire which is being fed to it.

In order to grip the wire the flange 29 is axially moved toward the flange 28. The result of this movement is that the beveled surfaces on the respective flanges and the pivoted segment 38 cause the segment 38 to move to a concentric position with the beveled surfaces of the flanges and to thus close the gap 43. This operation acts to grip the end of the wire in readiness for the winding operation.

After a proper number of coils are wound into the groove 39, the outer flange 29 is moved away from the flange 28 and the completed annulus is simultaneously ejected, as hereafter described.

Figure 11:
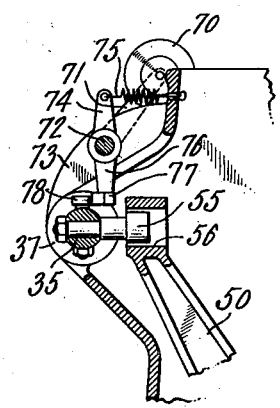
Fig. 11 is a rear elevational view, partially in section, of the mechanism for causing the axial movement of the winding flange.

Means for axial movement of the flange is provided by an air cylinder 44 pivoted to the frame 4 at 45, as shown in Figs. 1 and 2. The piston rod 46 of this cylinder connects with a compound leverage system. A triangular floating lever 47 connects at one of its pivots 48 to the piston rod 46. A second pivot 49 joins a bifurcated arm 50 which is pivoted at its center, and transmits horizontal movement to the rods 34 and 35. A third pivot 52 of the triangular lever joins a link 53 pivoted to the frame at 54. The object of this system of leverage is to obtain a quick movement of the flange 29, and at the same time to provide for a slower movement when the two flanges are nearly contacting. Referring to Fig. 11, at the upper end of the bifurcated arm 50 each half contacts with a stud 55 fastened to each rod 34 and 35. Lever openings 56 for engaging the stud 55 are vertically elongated to compensate for the radial movement of the arm 50.

When the two flanges are operated, ejector pins 57 are brought into action to expel the completed annulus from the apparatus, as shown in Figs. 2 and 4. A plurality of these pins 57 are disposed in recesses about the flange 28 in such manner as to form parts of the side wall of the groove 39. Each of these pins extends through the flange 28 and the end removed from the groove 39 is forked and contains a roller 58. A spring 59 bearing against the outer face of the flange 28 normally retains the ejector pin in inactive position, and a slidable key 60 retains the roller in proper radial position against rotation.

In order to actuate the ejector pins a plate 61 is fastened to the rods 34 and 35 so that when the flange 29 is axially moved outwardly the ejector plate 61 will contact with rollers 58, thus forcing the annulus out of the groove 39. To facilitate the removal of the annulus the bottom of the groove 39, as shown in Fig. 14, is tapered downwardly in the direction the annulus moves during ejection.

Means are provided for stopping the rotating flange 28 at a given point so that the wire gripping portion of the flange will come into alignment with the wire feeding mechanism. This means consists, in part, of electrical apparatus for cutting off the motor circuit as hereinafter explained. In addition to this, means are provided for mechanically stopping the flange at a definite point. As shown in Fig. 5, a lug 62 projects from the flange 28, and when the flange 29 is moved outwardly this lug strikes a stop plunger 63 mounted on the plate 61. A spring 64 carried by the plunger 63 absorbs the shock of the impact, while at the same time a locking latch 65, which is also mounted in the plate 61, engages the lug 62 and retains it in locked position. The locking latch is pivoted at 66 and held in place by a spring 67. A stop 68 limits the movement of the latch. Upon the closure of the flanges 28 and 29, the movement of plate 61 releases the lug 62 by moving the plunger 63 and latch 65 out of the path of movement of the lug 62.

Due to the radial movement of the flange and the simultaneous axial movement of the latch, the latch (Fig. 10) is provided with a two-directional bevel for engagement with the stop 63.

Figure 12:
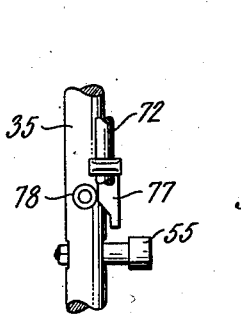
Fig. 12 is a plan view of a portion thereof.

As the wire is being wound on to the winding head 2, rollers 69 and 70, shown in Fig. 1, bear with pressure against the wire as the coil is being formed within the groove 39, for the purposes of insuring that the wires are compactly coiled, and assisting in causing the adjacent convolutions to adhere to each other. As shown in Figs. 1, 11 and 12, the roller 70 is supported from an arm 71, which, in turn, attaches to a shaft 72 mounted on bearings in an extended portion 73 of the frame 4. On an arm 74 keyed to shaft 72 is a spring 75 attached to the frame 4. This spring normally urges the roller 70 to bear against the coils within the groove. When the bead annulus is ejected it becomes necessary to remove the rollers 69 and 70 out of the way. This is accomplished by an arm 76 keyed to shaft 72 and having a cam 77. This cam is so situated that it engages with a roller 78 attached to the slidable rod 35. Accordingly, horizontal movement of this shaft operates to swing the roller 70 in or out of engagement with the flange groove 39, depending on the axial position of the flange 29. The roller 69 operates in the same way by movement of the rod 34.

*Feeding mechanism*

Figure 13:
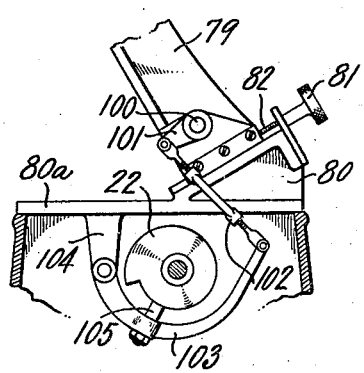
Fig. 13 illustrates a rear view of a portion of the wire cutting mechanism.

Referring particularly to Figs. 2 and 7, the feeding and cutting mechanism 3 is supported by a frame 79 joined to a dovetail slide block 80, an integral part of the plate 80a, fastened to the frame 4. As shown in Fig. 13, means is provided to move the frame 79 for adjustment. Movement may be effected by turning a hand wheel 81 which connects the frame 79 with a threaded shaft 82. The purpose of this adjustment is to position the feeding wire 83 in tangential relation with the winding reel. The frame 79 supports two parallel guide rods 84 and 85 which act as slideways for the feeding mechanism. The frame also supports an air cylinder 86. A slide block 87, slidable on rods 84 and 85, acts in part as a jaw for clamping the wire 83, as particularly shown in Figs. 6 and 7. A clamping jaw 88, pivotally mounted at 89 on the slide block 87, has arms 90 extending therefrom which engage with the piston rod 91 of cylinder 86. Stop collars 92 on the rods 84 and 85 limit the upward movement of the slide block 87. The engagement of the jaw 88 with the block 87 is particularly shown in Fig. 6.

As the piston rod 91 moves freely within the slide block 87, a limited turning movement may take place between the block 87 and the jaw 88 to clamp and release the wire 83. In fact, the piston 91 acts on the block 87 through the arms 90 and pivots 89. It can be seen from the drawings that as the piston moves upward the wire 83 is free to pass between the clamping jaws.

In the feeding operation the piston 91 moves downwardly and bears against the arms 90 with the result that the clamping jaw, being pivoted at 89, clamps the wire firmly between it and the slide block, and thereafter causes the latter to move downwardly. Connection 93 provides an inlet to the air cylinder for disengaging the jaws from the wire. Connection 94 provides means for lowering the piston and feeding the wire into engagement with the winding head in the gap 43.

Cutting mechanism

When the proper number of convolutions are wound in the groove 39, the cutting mechanism comes into operation to sever the wire 83. This comprises a shearing blade 95 and a shear bushing 96. The bushing is retained within a bracket 97 attached to a projection 98 extending from the frame 79. The bushing is positioned in axial alignment with the wire as it is fed into the gap 43, and the wire passes therethrough. Blade 95 is attached to a shearing arm 99 and is positioned so as to shear the wire at a point where it emerges from the opening in the bushing 96.

As particularly shown in Figs. 2, 7 and 13, arm 99 is keyed to a shaft 100 mounted in bearings in the frame 79. At the opposite end of this shaft a lever 101 pivotally attaches to a turnbuckle 102, which in turn connects with a cam lever 103. The cam lever is hinged to a bracket 104 extending from the plate 80a. Actuation of the shearing arm is then effected by movement of the cam 22 which engages the cam lever 103 through a cam rider or follower 105. In order to insure a quick movement of the arm 99 so as to produce a shear, a tortional spring 106 is positioned about the shaft 100. One end of this spring attaches to a peg 107 projecting from the frame 79, and the other end engages with a projection 108 on a collar 109 pinned to the shaft 100.

In the shearing operation it becomes necessary for the blade 95 to completely pass the hole in bushing 96, and then quickly return so as to allow the wire to continue to pass through the bushing. This is accomplished by a stop pad 110, preferably composed of rubber. The pad is retained by a bracket 111 extending from the frame 79. Flanges 112 extending from the shearing arm form a flat surface for engagement with the stop pad 110. The pad is positioned so that it will normally retain the shearing blade out of engagement with the shear bushing aperture, but due to the force of the shearing arm caused by the tortional spring the stop pad 110 will compress sufficiently to allow the shearing blade 95 to pass the aperture in the bushing and complete the shear.

Wire guiding mechanism

In starting a new annulus it becomes necessary to guide the end of the wire so that it will be in a receptive position for the clamping jaws at the gap 43. A guide shoe 113 is pivotally attached to a guide arm 114. A spring 115 attaches to the arm 114 and normally urges the shoe in proper guiding position. This spring and the pivot on the shoe are necessary for the reason that the winding head begins to rotate after the wire is grasped before the arm 114 is out of the way. The effect is that the flanges 28 and/or 29 may strike the shoe, but being pivoted the shoe is merely forced out of the way.

The guide arm 114 is hinged at about its center on a pin 116 mounted on the frame 79. Opposite the shoe end of the arm 114 there is a cam roller 117. This roller engages with a cam 118 connected to the movable slide block 87. Actuation of the slide block by the piston 91 carries with it the cam 118 which moves the shoe 113 inwardly or outwardly of the groove 39, depending upon the position of the elements in the operation.

Valve actuating and control mechanism

Referring to Figs. 1 and 15, the entire fluid pressure lines are controlled by the cylinder operating cam 23. The bracket 104 extending from the plate 80a provides a pivot 119 on which a cam arm 120 is mounted. A spring 121 connects an extension 122 of the cam arm to the side of the frame 4, thus retaining a cam projection 123 in engagement with the cam 23.

A pin 124 extends from the upper end of the cam arm 120 and engages in a slot 125 in a valve control bar 126. The opposite end of this bar is pivotally supported by an arm 127 connected to a shaft 128 mounted in bushings extending from the plate 80a. A hand lever 129 is also mounted on this shaft so that manual operation of the valve may be accomplished if so desired, particularly in starting the apparatus. The purpose of the slot 125 is to enable manual operation of the hand lever 129 without interfering with the automatic control by the cam arm 120.

A spring 130 positioned within the bar 126 normally retains the pin 124 of the cam arm at one end of the slot 125. A double acting conventional valve box 131, commercially known as the Ross valve, is positioned on top of the plate 80a, and has cooperating valve control arms 132 and 133. The arm 133 is held in raised or inoperative position by resting on the valve control bar 126. An indentation 134 in the bar permits the arm 133 to be lowered for operation of the cylinders 44 and 86, depending on the position of the valve control bar 126. The arm 132, integral with the arm 133, is pivotally connected to a piston rod 135. The piston rod connects loosely with a piston 136 vertically operable in a cylinder 137. This device is known as a "leak cylinder" or dash pot, and has for its purpose to hold one set of valves open for a given length of time. When the piston 136 is forced downwardly, a fluid pressure is introduced above it and the pressure gradually escapes as a compression spring 138 forces the piston back to its normal position in a given length of time. A second spring 139 circumscribing the piston rod at the upper end above the plate 80a normally urges the lever 133 into valve operating position unless restrained by the valve control bar 126.

Hand lever 140 forms a continuation of the arm 132 so that, in conjunction with lever 129, manual operation of the valves may be accomplished.

Pipe line 141 is connected to a supply source of fluid pressure (not shown) and communicates with the valve box 131 by a pipe line 142. From the valve box, pipe line 143 connects with flexible hose 94 attached to the upper end of cylinder 86. Intercepting the pipe 143 and the hose 94 is a valve 144 which has for its purpose to control the flow of fluid pressure so that actuation of cylinders 86 and 44 will be equalized and will operate simultaneously. A check valve 145 by-passing the valve 144 enables a free and quick flow of the fluid pressure within cylinder 86 when the piston therein is being withdrawn. Pipe 143 also connects with cylinder 44 by means of the connecting hose 146 attached to the front end of the cylinder. Reverse movement of the pistons in these cylinders is effected by means of pipe line 147 extending from the valve box and connected to cylinder 86 through a flexible hose 93 and to the cylinder 44 through a connecting hose 148. A short pipe 149 is an exhaust line extending from the valve box.

From the supply line 141, a dash pot 137 is operable by fluid pressure passing through pipe 150 and flexible hose lines 151 and 152. A valve 153 positioned between the hose lines 151 and 152 provides means for controlling the dash pot 137. This valve is automatically actuated, depending upon the movement of the piston in cylinder 86. An adjustable contact bolt 154 for engaging with the valve 153 is suspended from an arm 155 projecting from the slide block 87.

Electrical actuating control

In synchronism with the fluid pressure means a group of electrical switches operate to start and stop the motor 5 in proper sequence. Wires 156 and 157 are connected to a source of electricity. Wire 157 runs directly to the motor starting box 158. Wire 156 runs first to a hand starting switch and thence through wire 160 to an automatic switch 161. This automatic switch is controlled by movement of piston rod 46 in cylinder 44. The piston rod 46 supports a bracket 162 from which an adjustable contact screw 163 is attached. The contact screw is positioned in alignment with the switch pin 164 of the automatic switch so that it will strike the pin when the piston rod 46 is in extended position. The wire 165 connects the starting box 158 and the automatic switch 161. This wire completes a circuit with wire 160 within the automatic switch when the motor is in running operation.

When it is desired to stop the motor, automatic means provides a practically instantaneous brake. This is effected by means of a third wire 166 which joins with wire 160 within the automatic switch 161 when the contact is broken between wires 160 and 165. Wire 166 joins with the inertia relay 25, thence through wire 167 to the motor reverse operating coils within the starting box 158. This method of stopping the motor is commonly referred to as "plugging", and the inertia relay 25 is generally referred to as a "zero switch". Its object is to complete the reverse contact between wires 166 and 167 after the circuit interrupting operation of switch 161 and as long as the motor is in running operation. As soon as the motor ceases to rotate, the contact between wires 166 and 167 is broken and the entire electrical system remains at rest until the automatic switch 161 is again operated to start the motor 5 through movement of the piston rod 46.

Operation

In operation the single strand bead wire 83, extending from a source such as a supply reel and/or coating apparatus (not shown), is positioned in parallel relation with the feeding mechanism 3 (Figs. 3 and 6). The wire passes between the jaws 88 and the slide block 87, and is threaded through the shear bushing 96, after being cut to the proper length for the start.

Initially manual operation of the hand levers 129 and/or 140, and thereafter, rotation of the timing cam 23 permits the valve arm 133 to drop into the indentation 134 of the valve control bar 126.

Through the spring 139 the valves are caused to function so as to set cylinders 86 and 44 in piston extending operation. The piston in cylinder 86 moves downwardly, causing the wire to be held tightly by the clamping jaw 88, and to be carried downwardly a distance equal to the length of the stroke of piston 91. The wire, formerly ending at the edge of the shear bushing 96, now strikes guide shoe 113 and the wire is deflected into the gap 43 formed by the clamping means of the winding head. The cam 118, through the arm 114, places the shoe 113 in proper guiding position as the cam travels with the downward movement of the piston 91.

When the piston 91 reaches the end of its stroke, the contact bolt 154 (Fig. 15) strikes the valve 153, actuating the dash pot 137 to move the piston 136 downwardly against the springs 138 and 139 and setting the valves in operation to stop pressure flow to pipe line 143, and to cause a pressure flow in pipe line 147. This action causes the piston 91 to immediately reverse its stroke. The valve control arm 133 is now raised out of the indentation 134 and the valve control bar moves sideways so as to hold the valve control arm in this position. Shortly after this, the dash pot 137 loses its power to retain the arm 133 in elevated position, and for the next movement it is subject to the spring 139. Simultaneously with the reverse movement of the piston in cylinder 86, cylinder 44 is set in operation so that the flanges 28 and 29 come together and the clamping segment 38 is made concentric with the flanges with the result that the end of the wire is held tightly within the groove 39 formed by the two flanges. When this occurs the piston rod 46 in cylinder 44 is extended and the contact bolt 163 strikes the automatic switch pin 164. This action completes the circuit between wires 160 and 165, thus setting the motor 5 in operation.

The flange 28 is driven directly from the motor through a train of gears, and from the same source cams 22 and 23 are driven at the proper speed by the timing gears.

As the wire is being wound into the groove 39, cam 22 gradually raises the shearing arm 99 until the cam rider 105 reaches the cam step-off. At this point the shearing arm, with the assistance of tortional spring 106, makes a quick downward movement and severs the wire. At about the same time, cam 23 reacts to move the horizontal valve control bar 126 so that the valve actuating arm drops into the indentation 134, changing the control of the valves in box 131. Immediately both cylinders 86 and 44 begin to operate, the piston rod 91 being extended and the piston rod 46 being withdrawn.

The first slight receding movement of the piston rod 46 in cylinder 44 breaks the circuit within the automatic switch 161 between wires 160 and 165. At the same time, a circuit is made complete between lines 160 and 166 within the automatic switch. As a result of this hook-up, the reverse coils in the starting box react to "plug" the motor. The motor, however, does not reverse for the reason that as soon as it nearly stops rotating in its normal running direction a contact within the inertia relay 25 is broken, and the electrical apparatus remains at rest until further mechanical means and the fluid pressure system sets it again into operation.

As the piston rod 46 in cylinder 44 continues to recede, the flanges 28 and 29 become separated by means of the connections between flange 29 and the piston rod 46. Flange 28, through its own momentum, continues to rotate slowly after the electrical circuits are disconnected.

The ejector plate is now moved towards the flange 28 and further motion of the flange is arrested by the lug 62 which strikes the plunger 63. The latch 65 then engages with the lug 62 to retain the flange 28 in a definite, fixed position during the interval that it remains at rest.

The ejector plate in its forward movement engages with the roller 58 guided by the ejector pins. In this way, the ejector pins are forced outward, and the completed bead wire annulus positioned in the groove is expelled therefrom. As the flanges separate, the clamping segment for holding the end of the wire is released. The annulus drops down by gravity through the clearance made by the separated flanges. The finished bead wire is now either removed from the floor by an operator, or it may be carried away by a conveyor. The ends may be taped manually, if desired.

At this stage of the operation the feeding device 3 again moves the single strand wire forward. Valve 153 operates to reverse the pistons in their respective cylinders, and the apparatus continues in a similar cycle of operation.

While I have shown and described a present preferred embodiment of the invention and method of making the same, it is to be understood that the invention may be otherwise embodied and practiced within the spirit thereof and the scope of the appended claims.

Having thus described my invention, what I claim and desire to protect by Letters Patent is:

1. In a winding machine, a winding head having means for clamping a strand end, means for advancing a strand end to said clamping means, means for rotating the head a desired number of convolutions, and means for severing the strand at the completion of the winding operation.

2. In a winding machine, a winding head comprising a plurality of separately mounted members having relative axial movement for completing a winding groove and for discharging a completed annulus, and means for clamping a strand end in said groove, means for advancing a strand end to said clamping means, means for rotating said head for a desired number of revolutions, means for severing said strand at the completion of the winding operation, and means for causing relative axial movement of said members for closing said groove and for discharging a completed annulus therefrom.

3. In a winding machine, a plurality of relatively movable members having complementary faces defining a winding groove, one of said members having a pivotally mounted member defining a portion of said groove and constituting means for clamping a strand end in said groove, another of said members having a surface for engaging said pivoted member and forcing it into clamping position upon the closing of said groove, and for releasing said pivoted member upon opening said groove.

4. In a winding machine, a plurality of relatively movable members having complementary faces defining a winding groove, one of said members having a movable member defining a portion of said groove and constituting means for clamping a strand end in said groove, another of said members having a surface for engaging said movable member and forcing it into clamping position upon the closing of said groove, and for releasing said movable member upon opening said groove.

5. In a winding machine, means for clamping a strand end in a winding groove, means for advancing said strand end toward said groove, and movable guiding means for directing said strand end into said clamping means and withdrawing from said groove.

6. In a winding machine, means for clamping a strand end in a winding groove, means for advancing said strand end toward said groove, and movable guiding means actuated by said advancing means for directing said strand end into said clamping means and withdrawing from said groove.

7. In a winding machine, clamping means for a strand end disposed in a winding groove, means for advancing a strand end toward said groove and comprising a cam surface, a guide for directing said strand end into said clamping means and comprising a lever having a stationary pivot, a guiding sleeve for said strand mounted on one end of said lever and a cam follower on the other end of said lever whereby the position of said guiding sleeve is controlled by the movement of said advancing means.

8. In a winding machine, a guiding sleeve for a strand of material, a severing blade mounted to cross the opening in said sleeve for severing the strand, resilient means normally urging the blade into its severing position, means for moving said blade against said resilient means and then releasing the blade to permit it to move to its severing position under the energy stored in said resilient means, and a resilient stop for the blade, said stop being positioned to engage the blade before the latter reaches its severing position, whereby the severing operation of the blade is accompanied by a compression of the stop, the expansion of which serves to remove the blade from the opening after the severing operation.

9. In a winding machine, a clamping device comprising a movable member having an opening therethrough, a jaw pivoted to said member and co-operating with an edge thereof to constitute a clamp, an arm on said jaw, and a member extending loosely through said opening and engaging the end of said arm for actuating said jaw relative to said member and to move both as a unit.

10. In a winding machine, a clamp for gripping an end of a strand, means for advancing the clamp, a stationary guiding sleeve for the strand, a severing blade cooperating with said stationary guide, and a movable guide actuated by said advancing means for positioning the strand end after it leaves the stationary guide.

11. In a winding head, a pair of relatively movable rotary discs having complementary bevelled faces defining a winding groove and constituting a driving connection therebetween, and means for imparting relative axial movement to said discs to close said groove and to separate the discs to permit the removal of a completed annulus from said groove between said discs.

12. In a winding head, a pair of relatively movable rotary discs having complementary bevelled faces defining a winding groove and constituting a driving connection therebetween, and means comprising a quick acting toggle mechanism for imparting relative axial movement to said discs to close said groove and to separate the discs to permit the removal of a completed annulus from said groove between said discs.

13. In a winding head, a pair of relatively movable rotary discs having complementary bevelled faces defining a winding groove and constituting a driving connection therebetween, means for imparting relative axial movement to said discs to close said groove and to separate the discs to permit the removal of a completed annulus from said groove between said discs, and means effective upon the separation of said discs for locking at least one of them against rotation.

14. In a winding machine, a winding head, means for supporting said head, actuating means therefor, means for automatically advancing the end of a wire strand to said head, means for severing the strand, and means for controlling said actuating means in accordance with the operation of said advancing means.

15. In a winding machine, a winding head, means for supporting said head, actuating means therefor, means for automatically advancing the end of a wire strand to said head, means for severing the strand, and means for starting rotation of said head in accordance with the position of said advancing means.

16. In a winding machine, a plurality of members having relative axial movement and defining a winding groove when in engagement with each other, and means carried by one of said members and rendered effective upon the separation of the members for ejecting a wound annulus from said groove.

JAMES E. ALLAN.